UNITED STATES PATENT OFFIC

YOSHITARO YAMAMOTO, OF KOBE, JAPAN, ASSIGNOR OF ONE-FOURTH TO I; MIZUSAWA, OF HYOGO KEN, JAPAN, AND ONE-FOURTH TO TATSUZO KAN KOBE, JAPAN.

PROCESS OF DEODORIZING AND DECOLORING BEAN-FLOUR.

1,314,298.     Specification of Letters Patent.     Patented Aug. 2

No Drawing.     Application filed May 21, 1919. Serial No. 298,792.

*To all whom it may concern:*

Be it known that I, YOSHITARO YAMAMOTO, subject of the Emperor of Japan, residing at No. 5 Zitchome, Taikaidori, Hyogo, city of Kobe, Japan, have invented new and useful Improvements in Processes of Deodorizing and Decoloring Bean-Flour, of which the following is a specification.

This invention relates to a process of preparing deodorized and decolorized bean flour from raw bean, or deoiled bean and consists in steeping in a weak solution of an organic acid bean coarsely broken and deprived of its bran, until it has swelled and lost all its offensive smell, and color; then removing all the traces of the acid by carefully washing the material with water, and then drying and grinding it. The object of this invention is to obtain bean flour suitable for use as material for making sweetmeats, as a substitute of powdered milk, or for preparing bath powder, and the bean flour prepared according to my invention is most suited for such purpose, as it has no offensive smell inherent to raw bean, is white in color, and its albuminous constituents retain its digestive quality. Let me now describe how my invention is carried out. Take raw bean or bean deoiled without subjecting it to any high temperature, break it and remove bran therefrom. Then steep it in a solution of table vinegar dissolved in a proportion of from 1 to 2 liters of vinegar to 100 liters of water, warm the liquid with a heat not higher than 60° C., (or the liquid may not be warmed, if the bean is allowed to remain in it sufficiently long), and as soon as the bean has swelled and all the offensive smell inherent thereto has disappeared, take it out of the liquid and wash it with water. Then, in order to neutralize the acid still remaining it is again steeped in a solution of from 140 to 200 grams of bicarbonate of soda in 100 liters of water, and the bean is again washed with water, and dried with a low temperature. It is then ground and sieved, and the bean flour is obtained.

In carrying out this invention, instead of table vinegar, from 0.0045 to 0.0085% of acetic acid or any other harmless acid may be used, which is allow upon the bean without warming i after steeping the bean in a solutio if it is thoroughly washed with w process of neutralizing acid with a of bicarbonate of soda may be c with.

Bean flour as hitherto made, h defects, such as the offensive smell thereto, its light yellowish color, & is heated, part of the offensive smel removed, but then the albumin c becomes condensed and consequentl gestive. Now, according to my i bean is treated with a weak soluti organic acid and without causing c tion in the albumin, matters which the offensive smell and color of the decomposed and removed, such ma ing changed into soluble substance the product obtained by my process pure white in color, and retains minous components unaltered, that condition they exist in raw bean. bean flour produced by my proces used in place of wheat flour or ric making sweetmeats, as a substitute dered milk for drinking purpose food stuff for other purposes. I also used as material for prepar powder and also as body of soap.

I claim:—

The process of deodorizing and izing bean flour, which comprises the bean into a coarse powder and 1 the bran therefrom, steeping this in a solution of one to two liters o to 100 liters of water, heating the to a temperature not exceeding 60 moving the powder from said solu washing it with water, then stee powder in a solution of 140–200 ; bicarbonate of soda to 100 liters c removing the powder and again w; in water, and drying said powder temperature.

In testimony whereof I have si; name to this specification.

YOSHITARO YAMAM